US009260911B2

(12) United States Patent
Gontarski et al.

(10) Patent No.: US 9,260,911 B2
(45) Date of Patent: Feb. 16, 2016

(54) DOOR PANEL FOR OVERHEAD ROLL-UP DOORS AND A METHOD FOR CREATING THE SAME

(75) Inventors: Christopher Gontarski, Sugar Hill, GA (US); Brian Norbert Drifka, Richfield, WI (US)

(73) Assignee: RYTEC CORPORATION, Jackson, WI (US)

( * ) Notice: Subject to any disclaimer, the term of this patent is extended or adjusted under 35 U.S.C. 154(b) by 0 days.

(21) Appl. No.: 13/297,017

(22) Filed: Nov. 15, 2011

(65) Prior Publication Data
US 2012/0241107 A1 Sep. 27, 2012

Related U.S. Application Data

(60) Provisional application No. 61/466,925, filed on Mar. 23, 2011.

(51) Int. Cl.
E06B 9/00 (2006.01)
E06B 9/11 (2006.01)
B29C 65/50 (2006.01)
E06B 9/15 (2006.01)
B29L 31/00 (2006.01)
(Continued)

(52) U.S. Cl.
CPC .............. *E06B 9/11* (2013.01); *B29C 65/5021* (2013.01); *B29C 65/5028* (2013.01); *B29C 65/5042* (2013.01); *B29C 66/1142* (2013.01); *B29C 66/1162* (2013.01); *B29C 66/43* (2013.01); *B29C 66/71* (2013.01); *B29L 2031/724* (2013.01); *E06B 2009/1522* (2013.01); *E06B 2009/1555* (2013.01); *E06B 2009/1561* (2013.01); *E06B 2009/17092* (2013.01)

(58) Field of Classification Search
CPC .............. E06B 9/11; E06B 2009/1522; E06B 2009/1555; E06B 2009/1561
USPC ............ 160/236, 98, 120, 113, 40, 41, 121.1, 160/133, 185, 181, 218, 220, 229.1, 160/230–232, 264
See application file for complete search history.

(56) References Cited

U.S. PATENT DOCUMENTS 884,067 A * 4/1908 Brunke .......................... 160/230
2,336,852 A * 12/1943 Elmendorf .................... 156/211
(Continued)

OTHER PUBLICATIONS

International Search Report and Written Opinion for International Application No. PCT/US2012/024284 dated May 23, 2012, 18 pages.

*Primary Examiner* — Katherine Mitchell
*Assistant Examiner* — Johnnie A Shablack
(74) *Attorney, Agent, or Firm* — Factor Intellectual Property Law Group, Ltd.

(57) ABSTRACT

A door panel for an overhead roll-up door assembly having a first face, a second face, a top edge, and a bottom edge. The door panel is constructed by butt jointing at least two sub-panels together in a horizontal direction such that neither sub-panel overlaps the other and applying at least one strip of seaming material over each horizontal butt joint, the seaming material being adhered over each butt joint on at least the first face of the door panel. The door panel further includes at least one strip of seaming material adhered vertically along at least one face of the door panel extending from approximately the top edge of the door panel to approximately the bottom edge of the door panel, and being configured such that a top face of the vertical seaming material is substantially co-planar with a top face of the horizontal seaming material.

16 Claims, 2 Drawing Sheets

(51) Int. Cl.
*B29C 65/00* (2006.01)
*E06B 9/17* (2006.01)

(56) References Cited

U.S. PATENT DOCUMENTS

| | | | | |
|---|---|---|---|---|
| 2,458,537 | A | | 1/1949 | Skelly |
| 2,945,536 | A | * | 7/1960 | Smith et al. ............... 160/189 |
| 3,084,403 | A | * | 4/1963 | Elmendorf ................. 428/166 |
| 3,096,814 | A | * | 7/1963 | Ford et al. ................. 160/113 |
| 3,192,097 | A | * | 6/1965 | Abernethy ................. 428/49 |
| 3,297,077 | A | * | 1/1967 | Garbus ...................... 160/231.2 |
| 3,301,732 | A | * | 1/1967 | Kunz ........................ 156/304.3 |
| 3,302,690 | A | * | 2/1967 | Hurd ......................... 160/40 |
| 3,319,697 | A | * | 5/1967 | Krohn ........................ 160/229.1 |
| 3,562,973 | A | * | 2/1971 | Gangemi ..................... 52/71 |
| 3,583,465 | A | * | 6/1971 | Youngs et al. .............. 160/264 |
| 3,648,755 | A | * | 3/1972 | Thiele ....................... 160/201 |
| 3,650,872 | A | * | 3/1972 | McKiernan ................ 156/304.3 |
| 3,717,247 | A | * | 2/1973 | Moore ....................... 206/321 |
| 3,750,740 | A | * | 8/1973 | Newman .................... 160/354 |
| 3,941,180 | A | * | 3/1976 | Thill ......................... 160/229.1 |
| 3,980,123 | A | * | 9/1976 | Vago ......................... 160/201 |
| 4,269,253 | A | * | 5/1981 | Ziegler ...................... 160/201 |
| 4,326,631 | A | * | 4/1982 | Annand ..................... 206/389 |
| 4,388,134 | A | * | 6/1983 | Long et al. ................. 156/248 |
| 4,551,375 | A | * | 11/1985 | Sato et al. .................. 428/57 |
| 4,563,379 | A | * | 1/1986 | Kruger ...................... 428/61 |
| 4,569,383 | A | * | 2/1986 | Wentzel ..................... 160/201 |
| 4,574,861 | A | * | 3/1986 | Mao .......................... 160/133 |
| 4,736,785 | A | * | 4/1988 | Seuster ...................... 160/264 |
| 4,771,816 | A | * | 9/1988 | Clay, Jr. .................... 160/235 |
| 4,793,397 | A | * | 12/1988 | Whiteman .................. 160/201 |
| 4,800,946 | A | * | 1/1989 | Rosenoy .................... 160/264 |
| 4,885,820 | A | * | 12/1989 | Erceg et al. ................ 16/225 |
| 4,893,666 | A | * | 1/1990 | Hormann ................... 160/229.1 |
| 4,995,441 | A | * | 2/1991 | Leist et al. ................. 160/229.1 |
| 5,015,028 | A | * | 5/1991 | Bonnett ...................... 160/231.1 |
| 5,050,663 | A | * | 9/1991 | Rhoads et al. ............. 160/231.2 |
| 5,054,536 | A | * | 10/1991 | Leist et al. ................. 160/229.1 |
| 5,107,917 | A | * | 4/1992 | Larsson ..................... 160/229.1 |
| 5,129,441 | A | * | 7/1992 | Leist et al. ................. 160/229.1 |
| 5,265,663 | A | * | 11/1993 | Munekata et al. .......... 160/133 |
| 5,307,859 | A | * | 5/1994 | Kraeutler ................... 160/264 |
| 5,613,541 | A | * | 3/1997 | Bradbury ................... 160/231.2 |
| 5,964,270 | A | * | 10/1999 | Kirkey et al. .............. 160/273.1 |
| 6,145,571 | A | * | 11/2000 | Snyder ...................... 160/264 |
| 6,145,572 | A | * | 11/2000 | Kraeutler ................... 160/310 |
| 6,149,998 | A | * | 11/2000 | Hettinga .................... 428/44 |
| 6,655,442 | B2 | * | 12/2003 | Snyder ...................... 160/201 |
| 6,659,158 | B2 | * | 12/2003 | Laugenbach ............... 160/270 |
| 6,871,686 | B2 | * | 3/2005 | Eshpar ...................... 160/231.1 |
| 6,883,577 | B2 | * | 4/2005 | Frede ........................ 160/133 |
| 6,942,003 | B2 | | 9/2005 | Thompson |
| 7,040,373 | B2 | * | 5/2006 | Snyder ...................... 160/113 |
| 7,134,471 | B2 | * | 11/2006 | Bennett et al. ............. 160/201 |
| 7,273,646 | B2 | * | 9/2007 | Beitz et al. ................. 428/57 |
| D560,072 | S | * | 1/2008 | Willis et al. ................ D6/332 |
| 7,516,770 | B2 | | 4/2009 | Jerry |
| 8,714,230 | B2 | * | 5/2014 | Marszalek et al. ......... 160/264 |
| 8,777,516 | B2 | * | 7/2014 | Slutz ......................... 405/129.9 |
| 2002/0014314 | A1 | * | 2/2002 | Miller ........................ 160/23.1 |
| 2003/0205340 | A1 | * | 11/2003 | Nadar ........................ 160/236 |
| 2005/0155723 | A1 | * | 7/2005 | Johnston et al. ............ 160/133 |
| 2007/0006980 | A1 | * | 1/2007 | Zabala et al. ............... 160/133 |
| 2007/0272373 | A1 | * | 11/2007 | Curry, III ................... 160/230 |
| 2009/0084507 | A1 | * | 4/2009 | Tescher ...................... 160/44 |
| 2010/0032105 | A1 | | 2/2010 | Drifka |
| 2011/0018205 | A1 | | 1/2011 | Nelson |
| 2011/0083815 | A1 | | 4/2011 | Kriner et al. |
| 2011/0265959 | A1 | * | 11/2011 | Frede ......................... 160/133 |

\* cited by examiner

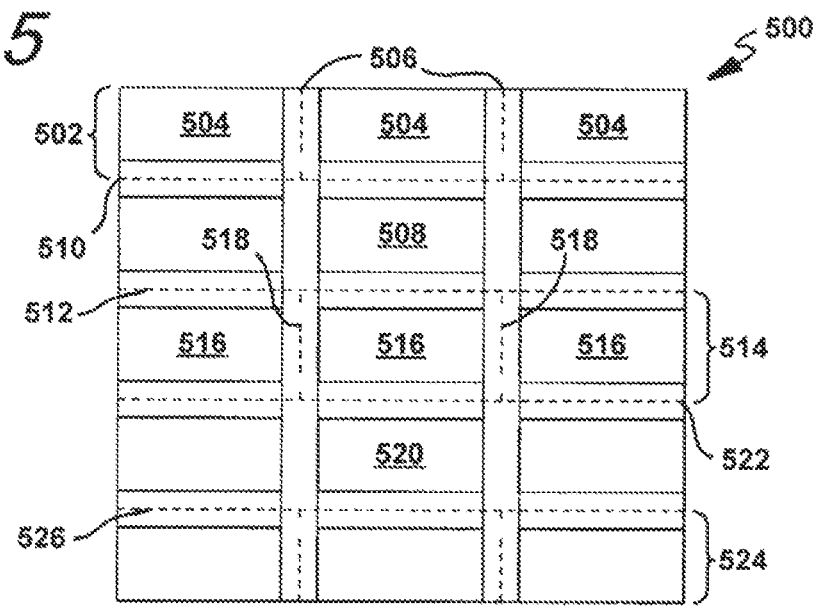
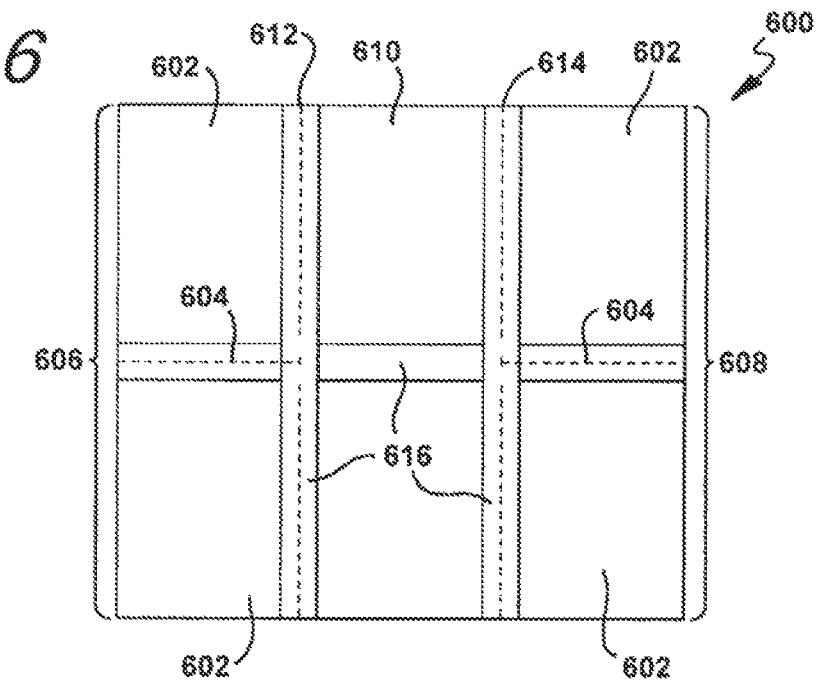

DOOR PANEL FOR OVERHEAD ROLL-UP DOORS AND A METHOD FOR CREATING THE SAME

RELATED APPLICATIONS

This application claims priority to U.S. Provisional Application Ser. No. 61/466,925 entitled "Provisional Patent Application Directed To A Roll Up Door Comprising A Flexible Panel Material Joined By Butt Joints And Vertical Connecting Joints" filed Mar. 23, 2011—the contents of which are fully incorporated herein by reference.

FIELD OF THE INVENTION

The present invention is related to overhead roll-up doors, and more specifically to an overhead roll-up door panel constructed from multiple panels that are butt jointed and seamed together.

BACKGROUND OF THE INVENTION

Industrial overhead roll-up doors typically permit and prohibit access to openings or doorways. These doors typically include a door panel having opposing side edges that engage with, and are vertically guided in, side columns. In some environments it may be necessary to provide the door panel with an increased wind load resistance in order to prevent the door panel from disengaging from the side columns, particularly when the door panel is moving vertically. In order to enhance the door's resistance to high winds and/or air pressure, it may be desirable to manufacture the door panels using flexible, heavy duty materials having an increased weight in order to provide better wind load resistance to the door panels. Regardless of wind load, it may be desirable to utilize door panels made from such heavy duty materials in industrial applications in order to provide a stronger door panel more resistant to damage, and/or a door panel capable of providing a better, more impenetrable barrier between sides of the opening.

Examples of heavy duty materials known in the art for use in such situations include Styrene-Butadiene-Rubber ("SBR") and ethylene propylene diene Monomer rubber ("EPDM"). While such materials may be used to create overhead roll-up doors, SBR, EPDM, and other similar materials are generally not made in custom widths. Typically, panels made from these materials are not wide and/or long enough to cover many openings or doorways opened and blocked by overhead roll-up doors in industrial applications.

In order to provide a large enough door panel, it is known in the art to connect multiple SBR, EPDM, or other heavy duty material panels together to form one large door. In practice, the multiple panels are typically joined by "skiving" the panels together. In order to skive the panels together, the edges of each material panel that are to be joined are cut at very sharp mating angles that are configured to overlap each other. The overlapped edges are then glued together. Skiving, however, has some drawbacks.

One drawback to creating a door panel by skiving together multiple material panels is the expense and precision of the equipment. In order to provide a smooth cut on each material panel and insure a proper mating angle, each cut must be extremely precise. In order to insure this precision, skiving blades typically need to be replaced frequently, increasing the manufacturing cost of the door panels.

Skiving may also produce significant waste. Each material panel must have a sufficient amount of material removed there from in order to insure a proper and satisfactory overlap for adhering each adjacent panel in a manner capable of supporting the remainder of the door panel.

Because of the overlap between each panel, skiving may also require use of additional material. Inasmuch as each material panel is cut and overlapped with another, over large expanses the total overlap may require the use of additional material panels to fully block the opening.

The overlap may also lead to uneven rolling of the door panel in the partially or fully open position. Uneven rolling may lead to buckling in the door panel when rolled up or may lead to increased roll sizes which requires larger headers, thereby increasing the cost of the header while reducing the size of the opening.

Another drawback to skiving is that it increases the tension on each material panel in the overall door as the skived joints make each panel located above the joint bear a significant portion of the weight of each panel located below the joint. In many environments it may be desirable to provide a window or a clear panel permitting vision from one side of the door to the other when the door panel is closed. If, for example, a clear polyvinyl chloride ("PVC") panel is used with a door panel that is skived, the PVC panel will typically stretch and deform from carrying the weight of the skived material panels located below the PVC panel. Since the skived door panel relies on the overlap seams to lift the panels below as the door panel moves vertically upwards, less strong materials like PVC, will stretch and deform, creating problems in the door panel and perhaps eliminating some or all of the visibility through the clear section. In order to avoid stretching and door panel damage, it is known in the art to cut a hole or area out of a full door panel and replace it with a clear material—however doing so limits visibility through the door panel. Furthermore, environments with many door panels, particularly when the door panels are constructed of black materials and/or the environment is poorly lit, limited visibility may be hazardous to the door and any people and objects attempting to pass there through.

An alternative method of joining panels together is shown in U.S. Pat. No. 4,736,785 to Seuster ("the '785 patent"). As shown in the '785 patent, it has been contemplated that panels may be horizontally butt jointed together with the horizontal butt joints secured with profiled stabilizing members held together by screws. However, amongst the problems associated with only horizontal support, utilizing profiled stabilizing members may lead to uneven rolling in the open position, and the '785 patent provides no vertical support for any of the panels, thereby leaving substantial weight bearing responsibilities on each panel for the panels below, and, in turn, the possibility that particular panels or materials may stretch or deform. Having no vertical stabilizing members or similar structure may also lead to increased wear on each panel forming the door taught in the '785 patent as there are no vertical strips or structures for the door panel to roll up on, leaving the faces of each door panel to contact each other.

Therefore, it would be advantageous to have a door panel utilizing heavy duty materials without requiring that multiple panels be skived together.

It would be further advantageous if such a door panel was capable of incorporating at least one full width panel made from a material different from the remainder of the material panels.

The present invention is directed to solving these and other problems.

SUMMARY OF THE INVENTION

The present invention is directed to a door panel for an overhead roll-up door assembly constructed by butt jointing and seaming sub-panels made from heavy duty materials, like for example SBR or EPDM. As is known in the art, the overhead roll-up door assemblies typically include door panels guided in side columns located proximate the edge of an opening or doorway which the door panel is raised and lowered to permit and prohibit access there through. In order to raise and lower the door panel, the roll-up door assemblies typically include a motor which rotates a drum which the door panel is wound on and off of.

According to one aspect of the invention, a door panel for an overhead roll up door is provided having multiple SBR or other heavy duty material panels butt jointed together horizontally across the width of the door panel, and in some embodiments vertically along at least a portion of the panels. Though it will be discussed herein as an "SBR panel" or "sub-panel" it should be appreciated by those having ordinary skill in the art that any heavy duty material, like for example EPDM, may be utilized in place of the SBR panels so long as the material is flexible enough to roll-up on a drum or similar structure in the open position, but heavy enough to withstand moderate or high wind loads without blowing out of or disengaging from the side columns of the door assembly. It is contemplated by the invention that in some embodiments single SBR panels may be utilized to cover the entire width of a particular opening. However, even when doing so a vertical portion of each SBR panel may be cut and jointed together, with at least one vertical portion in each panel extending from each horizontal butt joint, or, preferably, with the horizontal butt joints butting against relatively uninterrupted vertical butt joints. In embodiments where single or multiple SBR panels are required to fill the entire width of any opening, it is contemplated that each SBR panel may further utilize vertically oriented butt joint seaming material—even where physical vertical jointing is not required.

When butt jointing each SBR panel, whether doing so vertically or horizontally, it is preferred that no portion of any butt joint (including when seaming material is used as discussed herein) should overlap any portion of another butt joint and/or seaming material. Accordingly, when jointed in accordance with the teachings of the present invention, the adjacent surfaces of the joined panels should be substantially planar with each other as should any adjacent or butted seaming material. This, in turn, facilitates relatively smooth rolling and un-rolling as the door is wound toward and into an open orientation, and, when unwinding toward and into a closed orientation.

According to another aspect of the invention, each horizontal butt joint and any vertical butt joints may be seamed together by adhering at least one strip of seaming material over each butt joint on at least one of a first or second (front or back) face of the door panel, and more preferably on both the first and second face of the panel. In embodiments where the vertical butt joints do not extend vertically over the entirety of any SBR panel, it is contemplated by the invention that at least one strip of the seaming material may extend vertically along the entirety of the door panel in strips so as to cover vertically aligned butt joints. Alternatively, vertical seaming material may only extend vertically along at least one of the first or second faces of the door panel the distance required to seam together the portions of the SBR panels along which the vertical butt joints extend. The seaming material applied over each butt joint seam may be any material known in the art capable of adhering to the SBR panels and preventing the SBR panels from pulling apart as the door moves vertically or rests in a partially or fully closed position. Examples of material which may be used include but are not limited to fabric tapes, woven or partially woven fabrics or fabric tapes, PVC coated fabric tapes, Polyethylene Terephthalate ("PET") fabric strips, and PVC or other plastic strips bonded to each SBR panel over the butt joint. Regardless of whether any vertical butt joints are used to create the door panel, it is contemplated by the invention to include at least one vertical strip of seaming material extending from approximately a top edge of the door panel to approximately a bottom edge of the door panel to further support the weight of SBR panel and reduce wear friction on each SBR panel face.

As should be appreciated by those having ordinary skill in the art, butt jointing and seaming each SBR panel together reduces the cost and labor associated with creating door panels inasmuch as butt jointing requires little labor and less precision than skiving each SBR panel together. Additionally, butt jointing has little to no waste since an angled mating portion of each SBR panel does not have to be removed. Butt jointing and seaming also creates no overlap between SBR panels, eliminating buckling, minimizing roll size, and limiting or reducing the amount of SBR panels required to fill the width of a particular opening as the full width of each SBR panel may be used when creating the door panel.

According to yet another aspect of the invention, at least one full width clear panel made from PVC or a similar material may be horizontally butt jointed to the SBR panels. Though described herein as a "PVC Panel" it should be appreciated by those having ordinary skill in the art that any material capable of forming a clear panel may be used. As with any SBR panels horizontally butt jointed together, the PVC panel may have at least one strip of seaming material adhered along the entirety of the butt joints between the PVC panel and the SBR panel(s). In embodiments where full length vertical strips of seaming material are adhered to the first and/or second face of the door panel, the strips of vertical seaming material may be adhered to and extend continuously vertically on the clear panel. While utilizing butt joints and strips of seaming material to connect each SBR and PVC panel together will substantially reduce, and may even eliminate, the stretching or deforming of any PVC panels, extending vertical strips of seaming material along the entirety of the door panel, including the PVC panels further reduces stretching and deforming inasmuch as the vertical seaming material acts to lift and suspend any SBR panels located below any PVC panels, thereby reducing the weight each PVC panel has to carry. Extending vertical seaming material over each PVC panel reduces wear and scratching resulting from rolling, as with the SBR panels, the thickness of the seaming material will prevent the PVC panels from contacting each other or any SBR panels when the door panel is in a partially or fully opened position. As explained herein, when rolled, any seaming material will leave a gap between the face of any PVC panel and any rolled panels located above or below equal to at least the thickness of the seaming material.

According to another aspect of the invention, it may be advantageous to secure SBR strips, or other similar heavy duty material along with any vertical strips of seaming material on one or both faces of the door panel. Utilizing additional vertical SBR strips may enhance the space created between each panel in the rolled up position, and may help facilitate a smoother, more even roll. For example, in door panels which employ a thickened edge wind lock, and in particular a continuous thickened edge wind lock, applying vertical SBR strips along one face of the door panel may allow for the thickness of the thickened edges to be matched along the interior of the door panel where the SBR strips are applied, creating a more uniform roll.

According to another aspect of the invention, the seaming material may be reflective or made from a much lighter color than the SBR panels. Utilizing reflective or light colored seaming materials against the SBR panels may increase safety in environments where at least one side of the door panel is poorly lit, particularly when the door panel is made from black rubber.

Other aspects and features of the invention will become apparent to those having ordinarily skill in the art upon review of the following Description, Claims, and associated Drawings.

BRIEF DESCRIPTION OF THE DRAWINGS

FIG. 5 shows a front view of a door panel as contemplated by an embodiment of the invention.

FIG. 6 shows a front view of a door panel as contemplated by an embodiment of the invention.

DETAILED DESCRIPTION OF THE PRESENT INVENTION

Figure 1:
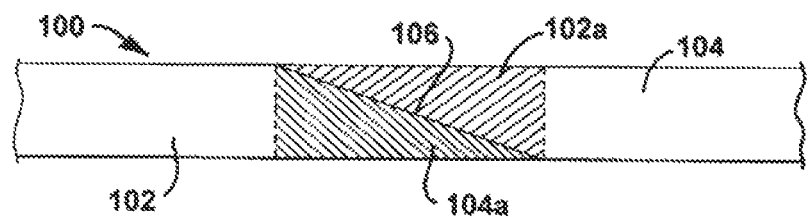
FIG. 1 shows a skived joint of two panels as is known in the prior art.

While the present invention is susceptible of embodiment in many different forms, there is shown in the drawings and will herein be described in detail, preferred embodiments of the invention with the understanding that the present disclosure is to be considered as an exemplification of the principles of the invention and is not intended to limit the broad aspect of the invention to the embodiments illustrated.

FIG. 1 is an exemplary embodiment of the method known in the prior art for joining together sub-panels which form a larger overhead roll-up door panel. As seen in FIG. 1, a portion of roll-up door panel 100 is formed by joining a first sub-panel 102 with a second sub-panel 104 by skiving the sub-panels together along mating angled edges forming a seam 106. As shown, skiving the sub-panels together results in significant overlap between sub-panels 102, 104, and results in a significant amount of waste as portions 102a and 104a must be removed from panels 102 and 104 respectively in order to form the mating angled edges on each panel. As explained herein, the overlapping further reduces the effective width of the two mated sub-panels, potentially requiring the use of an additional panel or a portion of an additional panel to fill the width of the doorway or opening. If utilized as a horizontal joint connecting sub-panels, like for example making 102 a top panel and 104 a bottom panel of a door panel, the skived joint places tremendous force on sub-panel 102 from sub-panel 104.

Figure 2:
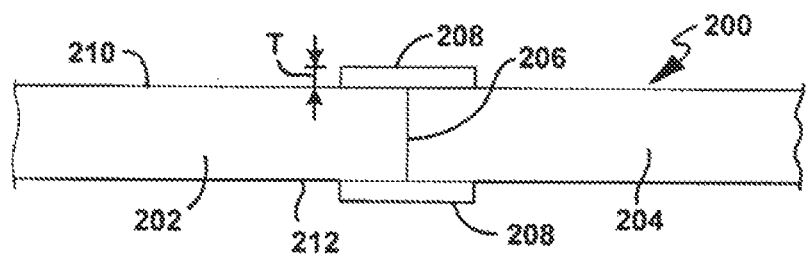
FIG. 2 shows a butt joint between two panels as contemplated by the invention.

FIG. 2 shows a preferred embodiment of the present invention for a method of joining sub-panels to form a larger overhead roll-up door panel. According to a preferred embodiment, door panel 200 is formed by butt jointing sub-panels 202, 204 along butt joint 206. Butt joint 206 should be formed such that only the bottom edge of sub-panel 202 and the top edge of sub-panel 204 contact each other. The butt joint should be formed such that neither sub-panel 202 nor sub-panel 204 overlaps the other in any manner, nor would any of the associated seaming material if so used.

In order to hold joint 206 together, a strip of seaming material 208 may be applied to at least first face 210 of door panel 200 over the seam. In some preferred embodiments, a strip of seaming material 208 may be applied over joint 206 on both first face 210 and second face 212 of the door panel in order to better hold each butt joint together.

It is contemplated by the invention that the thickness T of each portion or strip of seaming material 208 may range from just a few millimeters on up, no long as the thickness of each piece of seaming material is less than that of each sub-panel, 202, 204. According to one embodiment of the invention, it may be advantageous to utilize seaming material having a thickness of approximately 1/16th of an inch because such thickness does not inhibit the rolling of the door panel while providing an elevated ridge or elevated ridges along the back and/or front of the door panel which engage each other when the door panel is partially or fully rolled up. Having seaming materials which engage each other prevents the sub-panels from rubbing against each other, thereby reducing friction wear and scratches or the like on each sub-panel. Each strip of seaming material should be wide enough to adhere to the door panel and hold each butt joint together. In a preferred embodiment the width of each strip of seaming material should be about 2-3 inches, however it should be appreciated that any width capable of holding the butt joints together while providing enough surface area to create a gap between each sub-panel face when the door panel is in a partially or fully rolled up position.

In order to achieve larger thicknesses, it is contemplated by the invention that each strip of seaming material 208 may be adhered as a single thick body, or alternatively may be multiple layers of material adhered together forming a thicker body. As should be appreciated by those having ordinary skill in the art, layering multiple seaming materials together may be done before the seaming material is applied to door panel 200, or may be done by adhering one layer at a time to door panel 200 until a desired thickness or strength of the seaming material is reached.

The strips of seaming material may be adhered to the sub-panels and door panel using any means known in the art. As discussed herein, the seaming material may be a tape having its own bonding capabilities wherein the bonding side of the tape is adhered to each sub-panel. Alternatively, or in addition to using materials having their own bonding surfaces or capabilities, it is contemplated by the invention that glue or other bonding materials may be used to adhere the seaming material to the door panel over each butt joint. As a further alternative the seaming material may be vulcanized to each sub-panel. As yet additional alternatives, the seaming material may be stitched to the door panel overtop and proximate each butt joint, or may be chemically bonded to each sub-panel. It should be appreciated by those having ordinary skill in the art that any method of adhering or bonding one material to another known in the art is contemplated by the invention.

Figure 3:
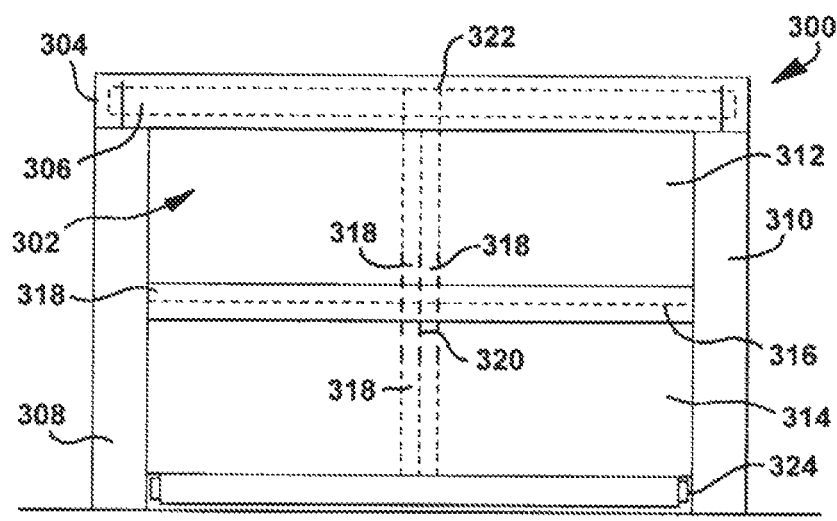
FIG. 3 shows a front view of a door panel within a door assembly as contemplated by an embodiment of the invention.

FIG. 3 shows a front view of a preferred embodiment of a door panel in a door assembly as contemplated by the invention. Though shown as a front view, it should be appreciated by those having ordinary skill in the art that the back view of at least the door panel may be substantially similar to the front view with respect to the sub-panels, butt joints, and any strips of seaming material located thereon. Door assembly 300 includes door panel 302, header 304 which houses drum 306 and any unrolled portion of the door panel, and side columns 308, 310 which engage marginal edges of the door panel to vertically guide the door panel between the open and closed positions. As shown in FIG. 3, door panel 302 is constructed using at least an upper and lower portion 312, 314, which are horizontally butt jointed along horizontal butt joint 316 with the but joint being covered and held together with at least one strip of seaming material 318 adhered to door panel 302.

In an embodiment of the invention, in order to reduce the stress on each door panel, at least one vertical butt joint 318, 320 may extend across at least a portion of each of the upper and lower portions 312, 314, respectively, from horizontal butt joint 316. In order to prevent these butt joints from separating, at least one strip of seaming material may be adhered to door panel 302 over the vertically butt jointed portions of upper and lower portions 312, 314 and extending from approximately top edge 322 to approximately bottom edge 324 of the door panel; or, any vertical distance in between. Vertically extending a continuous piece of the seaming material from approximately the top edge of the door panel to approximately the bottom edge may further reduce the stress on each sub-panel, and in particular upper portion 312, as the seaming material may help withstand the downward force resulting from lower portion 314.

Regardless of whether any vertical butt joints are used when constructing the door panel, in order to reduce the wear friction on the first or second face of the door panel and reduce the stress resulting from the weight of lower sub-panels, it is contemplated by the invention that at least one strip of seaming material extending from approximately top edge 322 to approximately bottom edge 324 may be adhered to at least a first face of door panel 302. Adhering the seaming material vertically along substantially the entire length of the door panel helps prevent the first and second faces of the door panel from contacting when rolled up in at least a partially open position, thereby reducing wear and scratches on the faces of the door panels as the thickness of the seaming tape creates a gap between each portion of the first and second faces of the door panel. In order to insure a uniform roll, it is contemplated by the invention that whether or not the door panel includes any vertical butt joints, one of the vertical or horizontal strips of seaming material may discontinue at the edge of the other so as to prevent the overlap of any seaming material. When utilizing a discontinuity in one of the vertical and horizontal seaming tapes, if a uniform thickness of seaming material is used for both the vertical and horizontal strips, a top face of the vertical strips of seaming material should be substantially co-planar with a top face of the horizontal strips of seaming material, making a uniform surface for rolling the door panel. In a preferred embodiment, in order to insure the full advantages of the vertical seaming tape, the strips of vertical seaming tape should extend continuously from approximately the top edge to approximately the bottom edge on one or two faces of the door panel, while the strips of horizontal seaming materials are discontinued at each vertical strip of seaming material. Each horizontal discontinuity should result in portions of horizontal seaming material substantially butting against the vertical strips of seaming material so as to form a substantially continuous layer of seaming material over each horizontal butt joint.

The advantage of adhering vertical seaming material to avoid wear may be enhanced when seaming material is applied to both the first and second face of the door panel. Applying vertical seaming material to both faces of the door panel creates a double layer of seaming material between each face when the door panel is rolled, creating either a slightly larger gap between the rolled faces of the door panel, or alternatively reducing the thickness of the seaming material required on each face to avoid contact inasmuch as the thickness of the seaming material when rolled is effectively doubled by the seaming material adhered to the first face rolling on top of the seaming material adhered to the second face.

In order to further enhance the spacing between each sub-panel, it is contemplated by the invention that a strip of SBR or other heavy duty material may be applied with each strip of seaming material, and particularly with any vertical strips of seaming material as described herein. The strips of heavy duty material may range in thickness from just a few millimeters on up, and in a preferred embodiment may be ½ inch, or, the thickness of any thickened edge wind locks applied to one face of the door panel, and may have a width of approximately 2-3 inches. These heavy duty material strips may be adhered directly to the door panel, to the strips of seaming material, or may be located between strips of seaming material—that is a strip of seaming material may be adhered to the door panel, a strip of SBR or other heavy duty material adhered to the strip of seaming material. Thereafter, a strip of seaming material may be adhered to the top of the SBR or other heavy duty material strips and, in some embodiments the face of the door panel, for aesthetic purposes. When utilized, SBR or other heavy duty materials may be adhered to the door panel and/or seaming material utilizing any of the methods described herein for adhering the seaming material to the door panel.

It is contemplated by the invention that upper portion 312 and lower portion 314 may each be a single sub-panel having no vertical butt joint or a partial vertical butt joint cut into each sub-panel. Alternatively, upper portion 312 and lower portion 314 may each include at least two sub-panels which are vertically butt jointed together along the entirety of the upper or lower portion. The vertically butt jointed upper portion and vertically butt jointed lower portion may then be horizontally butt jointed together to form door panel 302. As should be appreciated by those having ordinary skill in the art, a strip of seaming material should be used to hold any horizontal or vertical butt joints together on at least one face of the door panel.

Figure 4:
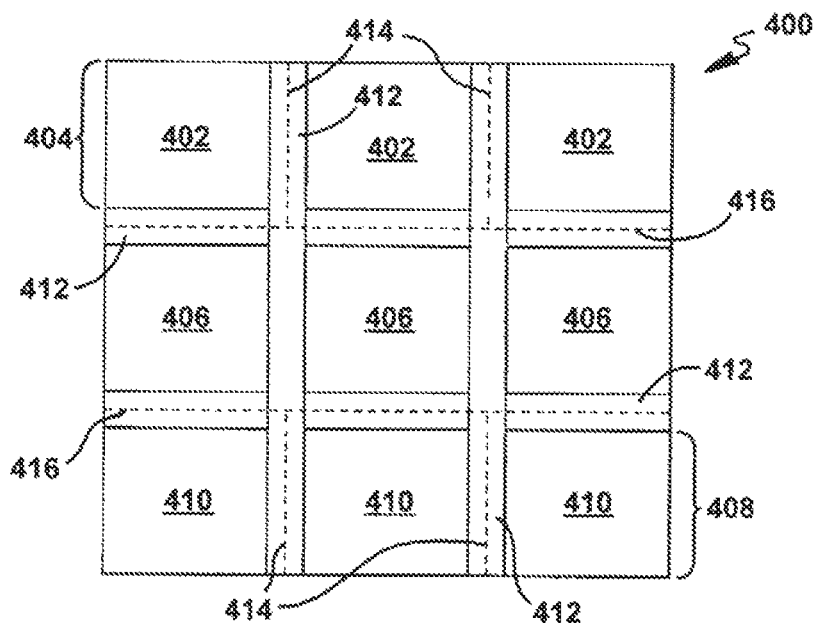
FIG. 4 shows a front view of a door panel as contemplated by an embodiment of the invention.

As shown in FIG. 4, in some embodiments it may be desired to place an intermediate panel between the upper and lower portions of the door panel. Door panel 400 may be a single horizontal panel or may be constructed by vertically butt jointing at least two sub-panels (shown as three sub-panels 402) together to form upper portion 404, horizontally butt jointing a continuous width intermediate panel 406 to a lower edge of the upper portion, and then horizontally butt jointing a lower portion 408 (shown as vertically butt-jointed sub-panels 410) to a lower edge of the intermediate portion.

According to an embodiment of the invention, intermediate panel 406 may be made from a material different from sub-panels 402, 410. In some embodiments, intermediate panel may be made from a flexible polymer or PVC material which may be substantially transparent. The intermediate panel may also, or alternatively, be made from a lower weight material than the sub-panels forming the upper and lower portions of the door panel, thereby reducing the total overall weight of the door panel to reduce the stress on the motor and other components used to open and close the door.

Because intermediate panel 406 may be made of any material known in the art, it may consequently be made from a material which is more likely to stretch or deform, i.e. is weaker, than the materials forming the sub-panels forming the upper and lower portions of the door panel. Deforming may be particularly problematic if the intermediate panel is substantially transparent as deformation may alter the visibility through the panel. In order to combat any stretching or deforming of the intermediate panel, as discussed herein, it may be particularly advantageous to provide full vertical butt joints along the upper and lower portions as well as adhering seaming material to the door panel from approximately the top edge to the bottom edge of the door panel, including over top the intermediate panel. Including full vertical butt joints along both the upper and/or lower portions of the door panel and adhering seaming material over a full vertical length of the door will further reduce the stress on the intermediate panel as the joints and/or seaming material may carry much of the weight imparted on the intermediate panel by each of the sub-panels. In order to maximize the effect of full vertical butt joints in the upper and lower portions, and to minimize the amount of seaming material covering the intermediate portion, as seen in FIG. 4, it may be advantageous to substantially align the vertical butt joints in the upper and lower portions such that each vertical butt joint in the upper portion substantially aligns with a vertical butt joint in the lower portion.

It is contemplated by the invention that additional intermediate portions may be included in the door panel. In order to create such a door, one or more intermediate portions may be created in a substantially similar manner to the upper and lower portions and disposed between the additional intermediate portions. For example, as shown in FIG. 5, door panel 500 may include a top portion 502 having multiple sub-panels 504 vertically butt jointed along vertical butt joints 506 and first intermediate panel 508 horizontally butt jointed along a bottom edge of the top portion at butt joint 510. Horizontally butt jointed to a bottom edge of the first intermediate panel at butt joint 512 may be intermediate portion 514 formed by vertically butting joints sub-panels 516 along vertical butt joints 518. Second intermediate panel 520 may then be horizontally butt jointed at butt joint 522 to a bottom edge of the intermediate portion, with lower portion 524 (which is formed in substantially the same manner as the upper and intermediate butt joints) horizontally butt jointed at butt joint 526 to a lower edge of the second intermediate panel. The first and second intermediate panels may be made from similar or different materials and one or both may be substantially transparent.

As yet a further alternative to each door panel, as shown in FIG. 6, it is contemplated by the invention that the intermediate panel may be vertically orientated. In such embodiments, rather than vertically butt jointing sub-panels to form upper and lower portions to form the door panel, door panel 600 may include sub-panels 602 horizontally butt jointed along butt joints 604 to form right and left portions 606, 608. Each of these left and right portions 606, 608 may then be vertically butt jointed to intermediate panel 610 along vertical butt joints 612, 614. As with any of the previous embodiments discussed herein, at least one strip of seaming material 616 may then be applied over top each butt joint, and preferably extend the entire distance both vertically and horizontally across door panel 600.

Alternatively, in embodiments where intermediate panel 610 is substantially transparent, it may be advantageous to adhere seaming material 616 to door panel 600 only over horizontal butt joints 604 rather than the full width. Inasmuch as intermediate panel does not have to bear any vertical weight from heavier sub-panels when vertically orientated, the total weight bearing load on the intermediate panel is reduced.

The above-described embodiments of the present invention are intended to be examples only. Alterations, modifications and variations may be affected to the particular embodiments by those of skill in the art without departing from the scope of the invention, which is defined by the claims appended hereto.

What is claimed is:

1. A door panel for an overhead roll-up door assembly for a vertically moving door to permit and prohibit access to an opening, the door panel having a first face, a second face, a top edge, and a bottom edge and further comprising:
    at least two sub-panels butt jointed together in a horizontal direction in a manner such that neither sub-panel overlaps the other;
    at least one strip of horizontal seaming material adhered over each horizontal butt joint, the at least one strip of horizontal seaming material being adhered over each horizontal butt joint horizontally across at least the first face of the door panel; and,
    at least one strip of vertical seaming material adhered vertically along at least one face of the door panel, the at least one strip of vertical seaming material extending from approximately the top edge of the door panel to approximately the bottom edge of the door panel, wherein the at least one strip of horizontal seaming material stops at a first edge of the at least one strip of vertical seaming material, and continues extending horizontally across at least the first face of the door panel from a second edge of the vertical seaming material so that a top face of the vertical seaming material is substantially co-planar with a top face of the horizontal seaming material.

2. The door panel of claim 1 wherein the vertical and horizontal strips of seaming material each have a width in the range of approximately two to three inches.

3. The door panel of claim 1 wherein the vertical and horizontal strips of seaming material are multi-layered.

4. The door panel of claim 1 wherein the horizontal and vertical seaming materials include at least one selected from the group comprising at least a partially woven material, fabric, PVC, PET, and a partially reflective material.

5. The door panel of claim 1 wherein the at least one strip of horizontal seaming material, and at least one strip of vertically seaming material, is adhered to the door panel on both the first and second faces of the door panel, wherein each strip of horizontal seaming material is adhered over each horizontal but joint.

6. The door panel of claim 1 wherein a strip of heavy duty material is attached to at least one of
    the at least one strip of vertical seaming material and
    the door panel proximate the at least one strip of vertical material.

7. The door panel of claim 1 wherein the at least one strip of horizontal seaming material has at least one discontinuity at each vertical strip of seaming material so as to not overlap any portion of the at least one vertical strip of seaming material.

8. The door panel of claim 1 further comprising at least three sub-panels, the three sub-panels configured such that:
    at least two sub-panels are vertically butt jointed forming at least one of a top portion of the door panel or a bottom portion of the door panel;
    wherein the top portion of the door panel and the bottom portion of the door panel is horizontally butt jointed to at least one other sub-panel to form the door panel.

9. The door panel of claim 8 wherein the at least one strip of vertical seaming material covers each vertical butt joint as the at least one strip of vertical seaming material extends vertically from approximately the top edge of the door panel to approximately the bottom edge of the door panel.

10. The door panel of claim 1 wherein the vertical and horizontal strips of seaming material have a thickness less than a thickness of each sub-panel.

11. The door panel of claim 10 wherein the vertical and horizontal strips of seaming material have a thickness of approximately 1/16th of an inch.

12. The door panel of claim 1 further comprising at least three sub-panels, the three sub-panels including
   a top sub-panel;
   a bottom sub-panel; and
   an intermediate sub-panel disposed between the top and bottom sub-panels, the intermediate sub-panel having a width substantially equal a width of the top and bottom sub-panels and being horizontally butt jointed to each of the top and bottom sub-panels.

13. The door panel of claim 12 wherein the intermediate panel is substantially transparent.

14. The door panel of claim 12 wherein the at least one strip of vertical seaming material adhered along at least one face of the door panel creates a gap between the first and second faces of a rolled portion of the door panel when the door panel is rolled-up in at least a partially open position.

15. The door panel of claim 14 wherein the top sub-panel and bottom sub-panel are each formed by vertically butt jointing at least at least two sub-panels together and a vertical butt joint formed in the top sub-panel substantially aligns with a vertical butt joint formed in the bottom sub panel.

16. The door panel of claim 15 wherein the top and bottom sub-panels each include at least three vertically butt jointed sub-panels, each vertical butt joint in the top sub-panel aligning with a corresponding vertical butt joint in the bottom sub-panel.

* * * * *